United States Patent
Sharma et al.

(10) Patent No.: US 12,189,683 B1
(45) Date of Patent: Jan. 7, 2025

(54) SONG GENERATION USING A PRE-TRAINED AUDIO NEURAL NETWORK

(71) Applicant: Amazon Technologies, Inc., Seattle, WA (US)

(72) Inventors: Mayank Sharma, Bhopal (IN); Anil Kumar Nelakanti, Bangalore (IN); Prabhakar Gupta, Delhi (IN); Kumar Keshav, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 46 days.

(21) Appl. No.: 17/547,727

(22) Filed: Dec. 10, 2021

(51) Int. Cl.
- *G06F 16/00* (2019.01)
- *G06F 7/00* (2006.01)
- *G06F 16/65* (2019.01)
- *G10L 25/30* (2013.01)
- *G10L 25/57* (2013.01)

(52) U.S. Cl.
CPC .............. *G06F 16/65* (2019.01); *G10L 25/30* (2013.01); *G10L 25/57* (2013.01)

(58) Field of Classification Search
CPC .......... G06F 16/65; G10L 25/30; G10L 25/57
USPC ....................................................... 707/740
See application file for complete search history.

(56) References Cited

U.S. PATENT DOCUMENTS

| | | | |
|---|---|---|---|
| 2005/0016360 A1* | 1/2005 | Zhang | G10H 1/0033 84/600 |
| 2005/0131688 A1* | 6/2005 | Goronzy | G10L 25/78 704/E15.045 |
| 2013/0046536 A1* | 2/2013 | Lu | G10L 25/78 704/E15.039 |
| 2015/0199351 A1* | 7/2015 | Borenstein | G06F 16/43 707/740 |
| 2015/0301718 A1* | 10/2015 | Trollope | G06F 16/632 715/716 |
| 2017/0193362 A1* | 7/2017 | Cremer | G06N 3/04 |
| 2020/0228596 A1* | 7/2020 | Fuzell-Casey | G06F 16/634 |
| 2020/0401367 A1* | 12/2020 | Roblek | G06F 3/165 |
| 2022/0027407 A1* | 1/2022 | Ikezoye | G06F 16/686 |

\* cited by examiner

*Primary Examiner* — Raquel Perez-Arroyo
(74) *Attorney, Agent, or Firm* — Kilpatrick Townsend & Stockton LLP

(57) ABSTRACT

Described herein is a computer-implemented method for extracting and identifying an audio song. An audio file can be accessed by a computing device. A set of audio categories and a set of probabilities associated with the set of audio categories can be determined for a first audio clip. A subset of the set of audio categories can be determined based on a subset of the set of probabilities. Each audio category of the subset of the set of audio categories can correspond to an audio class label. Whether the first audio clip is part of a song can be determined. The song can be defined by combining the first audio clip with other audio clips.

18 Claims, 11 Drawing Sheets

FIG. 8

SONG GENERATION USING A PRE-TRAINED AUDIO NEURAL NETWORK

BACKGROUND

A video file such as a movie or television show may include a video portion and an audio portion. The audio portion may include the audio that is output via speakers when the corresponding video portion is output on a display. Depending on the type of video file, the audio portion may include various types of sounds including, in some cases, songs.

BRIEF DESCRIPTION OF THE DRAWINGS

Various examples in accordance with the present disclosure will be described with reference to the drawings, in which:

FIG. 8 illustrates an example of a user interface associated with language agnostic song extraction and identification, according to at least one example;

DETAILED DESCRIPTION

Figure 1:
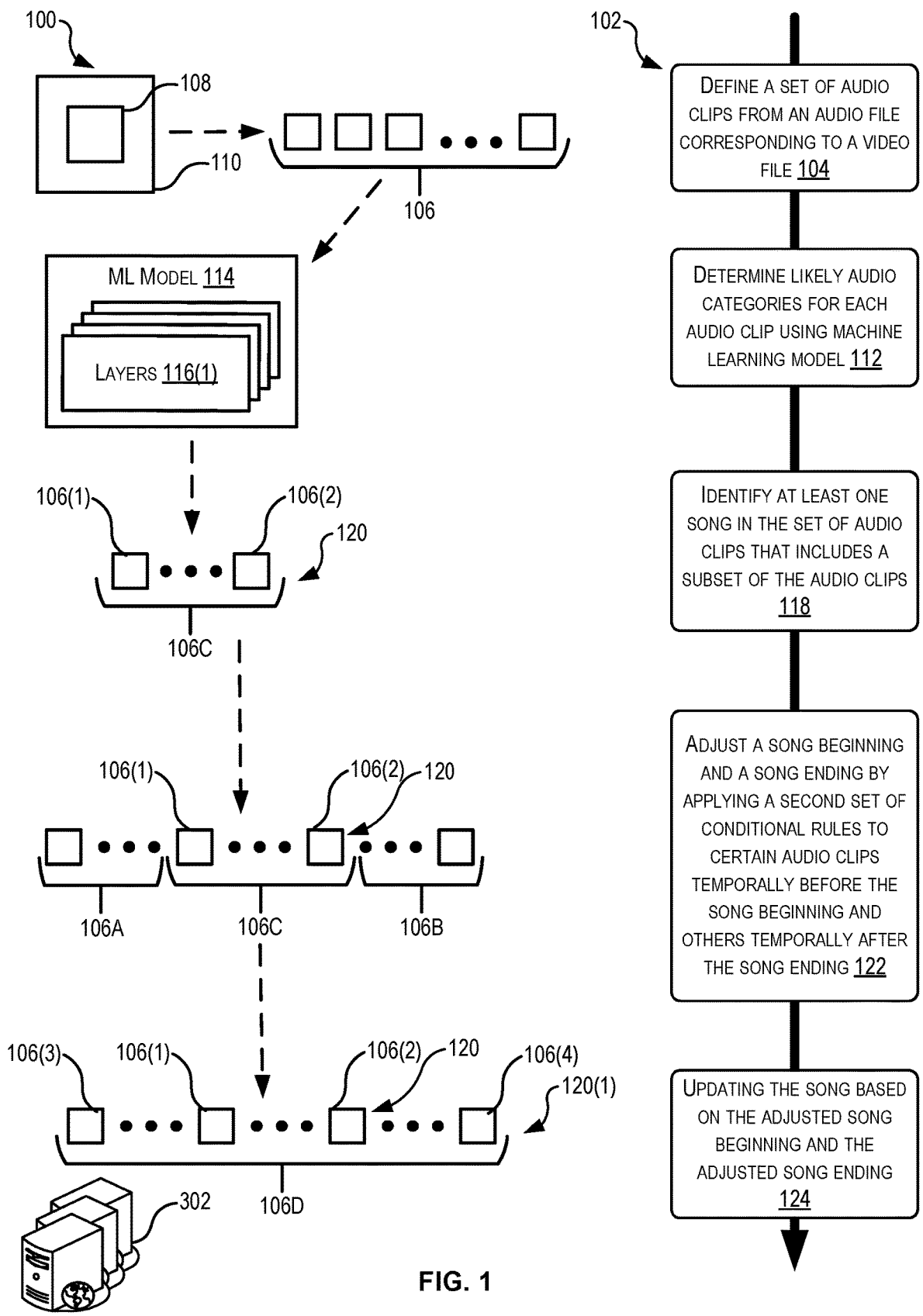
FIG. 1 illustrates an example block diagram and associated flowchart showing a process for implementing techniques relating to language agnostic song extraction and identification, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples described herein are directed to, among other things, various techniques for dynamically extracting and identifying audio songs, such as audio songs that are present in a video file (e.g., a film, a series, etc.). A computing device can perform operations relating to extracting and identifying audio songs at run-time (e.g., on-the-fly) and by using one or more machine-learning techniques or models. In an example, the computing device can use a pre-trained audio neural network (PANN), a convolutional neural network (CNN), other suitable neural networks, other suitable machine-learning model architectures that are not neural networks, or any suitable variation or combination thereof. An audio file may be divided into short clips (e.g., about five seconds long) and input into one of the machine learning models. The machine learning model may then classify each audio clip into different categories of sound. This classification step may include outputting a probability, for each category, of the respective audio clip being the type of sound represented by the category. The probabilities and determined categories can then be evaluated with respect to a set of conditional rule sets that identify which types of audio categories are likely audio songs. This can include sounds like those produced by musical instruments, singing, chanting, and the like, while also excluding certain types of music not associated with songs. This process can identify beginnings and endings for multiple songs in the audio file. Sequential audio clips between a beginning and an end can be stitched together to define the content of the song. In some examples, the beginnings and the endings can be refined by again evaluating some portion of the audio clips occurring before the beginning and a some portion of audio clips occurring after the ending using a different set of conditional rule sets tuned to identify intro and outro portions of songs. Practically, this may include identifying additional audio clips that should be merged with the identified songs, thereby redefining the beginnings and the endings and making the songs longer in length. Because the techniques described herein focus mainly on the sounds present in the clips, the techniques may be agnostic to the language of a singer in the song. Thus, the techniques described herein may be applied to identify, for a single audio file, different songs in different languages (e.g., a first song in Indian and a second song in English), songs in different languages (e.g., a first part of a song in Indian and a second part of the same song in English), and other suitable combinations of songs in different languages.

In a particular example, a computing device, such as a webserver, a personal computing device, a tablet computer, a smartphone, or the like, can access a video file. The video file can include a movie or other similar multimedia content that includes audio data and/or video data. The computing device can extract an audio file from the video file and divide the audio file into a set of audio clips. The audio clips can include configurable-length audio clips (e.g., audio clips having configurable and/or varying durations). The computing device can determine probabilities that each of the audio clips may correspond to different types of sounds. In an example, the types of sounds can include music, speech, vehicle, and other suitable types of sounds. The computing device can apply a threshold to the determined probabilities for determining a subset of determined audio categories corresponding to each audio clip. For example, this may result in a "top" most likely audio categories for each audio clip. The computing device can determine whether each audio clip corresponds to or otherwise includes a song by applying a subsequent threshold operation and by evaluating the audio clips according to audio class conditional statements. These operations may function to filter out the audio clips with top categories that do not correspond to songs, resulting in only audio clips that are likely to belong to songs. The computing device can subsequently generate or otherwise identify the song by combining continuous audio clips. In some examples, multiple songs with breaks in between may be identified within the audio file. Once the songs have been identified, time information about the songs may be stored in association with the video file. This may be used to enhance a user experience when interacting with the video file. For example, a "skip song" button may be presented when a user is viewing the video file in a video player at a time corresponding to when the song will be played. Playlists may be compiled and generated that enables the user to selectively pick which scenes of the video file to view based on the songs that accompany those scenes.

Turning now to the figures, FIG. 1 illustrates an example block diagram 100 and associated flowchart showing a process 102 for implementing techniques relating to language agnostic song extraction and identification, according to at least one example. The diagram 100 depicts devices, objects, and the like that correspond to the process 102. The process 102 can be performed by any suitable combination of hardware and/or software, as described herein.

FIGS. 1, 4-7, and 10 illustrate example flow diagrams showing respective processes 100, 400, 500, 600, 700, and 1000, as described herein. The processes 100, 400, 500, 600, 700, and 1000 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

A song extraction and identification engine 202 (FIG. 2) embodied in a computer system 302 (FIG. 3) and/or within a user device 304 (FIG. 3) may perform the process 102. Thus, while the description below is from the perspective of the computer system 302, the user device 304 may also perform the process 102 or portions of the process 102.

The process 102 may begin at block 104 by the computer system 302 defining a set of audio clips 106 from an audio file 108 corresponding to a video file 110. The video file 110 may include a movie, a television show, an amateur video, or other suitable type of video file having audio data. The audio file 108 may include audio data from the video file 110, and, in an example, the audio file 108 may include a subset (e.g., from one or two seconds of audio data to audio data of the duration of the video file 110) of the audio data from the video file 110. The set of audio clips 106 is included in the audio file 108. In an example, the set of audio clips 106 may include a set of equal-sized audio clips that span the audio file 108. A size of each audio clip of the set of audio clips 106 may be configurable to a desired size and need not be equal-sized. In some examples, each audio clip 106 may be transformed to be Spectrograms of the time-domain audio signals prior to performing later blocks. In some examples, each audio clip 106 may not be transformed.

The process 102 may continue at block 112 by the computer system 302 determining likely audio categories for each audio clip of the set of audio clips 106 using a machine-learning model 114. The machine-learning model 114 may include any suitable artificial intelligence architecture such as a pre-trained audio neural network (PANN), etc. The machine-learning model 114 may include any suitable number of layers 116 for determining the likely audio categories for each audio clip. Each layer of the layers 116 may perform one or more operations (e.g., ingesting one or more audio clips, mapping the audio clips to likely audio categories, etc.) for determining the likely audio categories. In an example, the machine-learning model 114 may determine the likely audio categories of the audio clips 106 from a set of predefined audio categories. The audio categories can include music, speech, vehicle, lawnmower, and other suitable types of sound categories. For example, the machine learning model 114 may be configured to classify the audio clips 106 into the sound categories. These classifications can then be sorted, filtered, and otherwise relied upon by the computer system 302 to perform additional techniques described herein. Each sound category may also be associated with a predefined audio class label of a set of predefined audio class labels such as a speech class, a song class, a music class, a removed music genres class, and the like. In this manner, each audio class functions to group together like sounds. As the techniques described herein are directed to identifying songs, sound categories that are identified, but not included in one of the predefined classes, may be disregarded as not likely forming part of a song.

The process 102 may continue at block 118 by the computer system 302 identifying at least one song 120 in the set of audio clips that includes a subset of the audio clips 106C. The at least one song 120 may include song beginning (e.g., a first audio clip 106(1)) and a song ending (e.g., a second audio clip 106(2)) and any suitable number of audio clips between the first audio clip 106(1) and the second audio clip 106(2). Identifying the at least one song 120 may include evaluating the audio categories of each audio clip with respect to a set of conditional rules. The conditional rules may involve applying one or more threshold operations to each audio clip. In an example, the conditional rules may involve determining whether each audio clip is part of the at least one song 120 by applying a first threshold to each audio clip using the corresponding sound category probabilities. The threshold can be predefined or configurable, may range from zero to one, and may correspond to certain probabilities. In an example, the first threshold can be defined as 0.3, and the computer system 302 may apply the threshold to the set of clips 106 to identify a top set of audio categories for the set of clips 106, e.g., those categories that have probabilities equal to or greater than 0.3. Next, the computer system 302 may evaluate the top set of audio categories for the set of clips 106 using a set of conditional rules and using the audio class labels to which the individual audio categories belong. This may allow the computer system 302 to further refine the set of audio clips 106 by filtering out audio clips that are not likely part of the at least one song 120. The remaining audio clips 106C form the at least one song 120. The computer system 302 can repeat the threshold operation and conditional rule evaluation for each audio clip and, based on the results of the threshold operation, identify the first audio clip 106(1) and the second audio clip 106(2) and any audio clips temporally between these two audio clips 106(1) and 106(2). In some examples, these audio clips 106(1) and 106(2) may define a coarse song beginning and a coarse song ending. In an example, a group of audio clips with probabilities that exceed the threshold may be determined as songs and a beginning and end of the group of audio clips may be determined as the coarse song beginning and the coarse song ending, respectively.

The process 102 may continue at block 122 by the computer system 302 adjusting a song beginning (e.g., the audio clip 106(1)) and a song ending (e.g., the audio clip 106(2)) by applying a second set of conditional rules to certain audio clips temporally before the song beginning (e.g., set of earlier audio clips 106A) and to other audio clips temporally after the song ending (e.g., set of later audio clips 106B). In an example, the second set of conditional rules may be similar or identical to the conditional rules applied with respect to the block 118. In another example, the number of audio clips in the set of earlier audio clips 106A and the number of audio clips in the set of later audio clips 106B may correspond to a configurable amount of time before the audio clip 106(1) and after the audio clip 106(2). For example, the sets of audio clips 106A and 106B may include clips corresponding to 30 seconds. Thus, the computer system 302 may check a predetermined, or otherwise configurable, time distance before the coarse song beginning (e.g., the audio clip 106(1)) and after the coarse song ending (e.g., the audio clip 106(2)) to first identify the sets of audio clips 106A and 106B, then evaluate audio clips in the sets of audio clips 106A and 106B using the second set of conditional rules and based on the assigned classes and/or categories. The second set of conditional rules may be used to determine whether the audio clips prior to the coarse song beginning and after the coarse song ending are part of a similar song. For example, at least some audio clips in the set of audio clips 106A may correspond to an intro of the song 120 and at least some audio clips in the set of audio clips 106B may correspond an outro of the song 120. Accordingly, the computer system 302 can update the beginning and the ending of the song 120.

The process 102 may continue at block 124 by the computer system 302 updating the song 120 based on an adjusted song beginning clip 106(3) and an adjusted song ending clip 106(4). The computer system 302 may update the song by combining audio clips from the sets of audio clips 106A and 106B with audio clips from the set of audio clips 106C based on the results of block 122. This may result in the computer system 302 defining a new song 120(1) that includes the defined song 120 including the adjusted song beginning clip 106(3) and the adjusted song ending clip 106(4).

Figure 2:
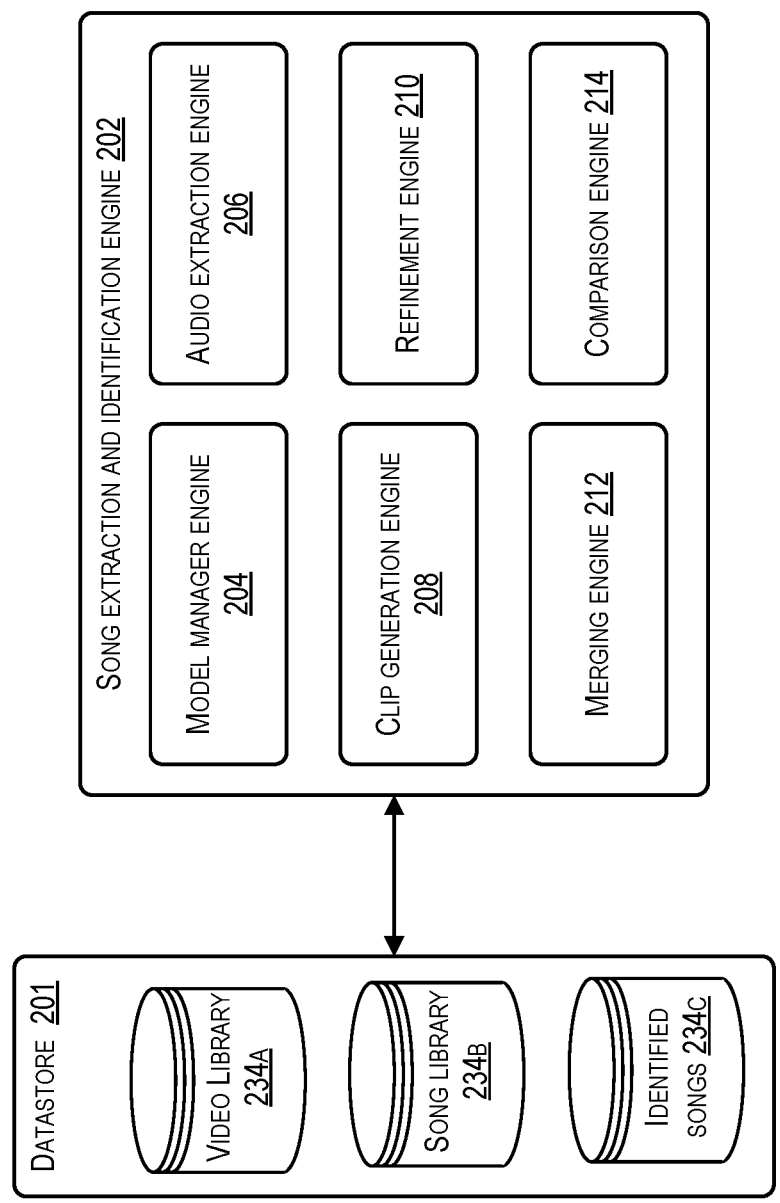
FIG. 2 illustrates an example block diagram of a song extraction and identification engine, according to at least one example.

FIG. 2 is an example block diagram of an architecture 200 including a song extraction and identification engine 202, according to at least one example. As illustrated, the song extraction and identification engine 202 is communicatively coupled (e.g., via a wired connection or a wireless connection) to a data store 201. The data store 201 includes a set of data libraries 234. As illustrated, the data libraries 234 include a video library 234A, an audio library 234B, and an identified songs library 234C. In an example, the data libraries 234 and/or the data store 201 can include any other suitable data, databases, libraries, and the like.

The song extraction and identification engine 202 includes a model manager engine 204, an audio extraction engine 206, a clip generation engine 208, a refinement engine 210, a merging engine 212, and a comparison engine 214. In an example, the song extraction and identification engine 202 can include any other suitable engines, modules, models, and the like.

The model manager engine 204 can include one or more machine-learning (or artificial intelligence) models. In an example, the model manager engine 204 may include one or more PANNs, one or more CNNs, or other suitable amounts or types of machine-learning models. The model manager engine 204 can manage various tasks related to the machine-learning model. In an example, the model manager engine 204 may train the machine-learning model, may ingest data into the machine-learning model, may transmit or otherwise share output from the machine-learning model, and any other suitable tasks. In an example, the model manager engine 204 may be the machine-learning model, may take the machine-learning input, and may output the machine-learning output relating to song extraction and identification. The machine-learning model of the model manager engine 204 may be configured to label audio clips, output audio fingerprints, output probabilities relating to categories or classes, and/or perform other suitable machine-learning tasks with respect to the audio clips described herein.

The audio extraction engine 206 may be configured to extract audio files from video files. In an example, the audio extraction engine 206 may receive a video file (e.g., from the video library 234A) that may include video data, audio data, and other suitable data. The audio extraction engine 206 may extract audio data, or any other suitable day, from the video file to generate or to otherwise identify or determine the audio file.

The clip generation engine 208 can use the audio file extracted by the audio extraction engine 206 to generate a set of audio clips. In an example, the clip generation engine 208 can split some or all of the audio file into a set of audio clips. Each audio clip of the set of audio clips may be characterized by a similar duration or length. In an example, each audio clip can be three seconds long, four seconds long, five second long, six seconds long, or any other suitable length of time or suitable duration for the audio clips. Each audio clip of the set of audio clips may be characterized by a similar or identical duration compared to the duration of other clips. In an example, each audio clip may be characterized by a different duration compared to one or more other audio clips.

The merging engine 212 may merge audio clips from the audio file for generating or otherwise identifying a song based on the audio clips. In an example, the merging engine 212 may merge the audio clips identified or otherwise determined as part of the song. Merging the audio clips may involve concatenating the separate audio clips into a single, merged audio clip that may represent the song.

The refinement engine 210 may refine the audio clips generated by the clip generation engine 208 and/or merged by the merging engine 212. In an example, the clip generation engine 208 or other suitable component or sub-process of the song extraction and identification engine 202 may define, determine, or otherwise identify a coarse song beginning and/or a coarse song ending based on the set of audio clips. The refinement engine 210 may refine the audio clips to identify more appropriate song endings and song beginnings by evaluating certain audio clips temporally adjacent to the coarse song beginnings and endings. In an example, the refinement engine 210 may refine or otherwise adjust the coarse beginning of the song and/or the coarse ending of the song by applying one or more sets of conditional rules to audio clips proximate to the coarse beginning of the song and the coarse ending of the song.

The comparison engine 214 may compare the merged audio clip that may represent the song to existing songs. In an example, the comparison engine 214 may compare the merged audio clip to one or more songs in the identified songs library 234C. In response to determining a matching song, the comparison engine 214 may output the song identified as similar to or otherwise matching the matching song.

Figure 3:
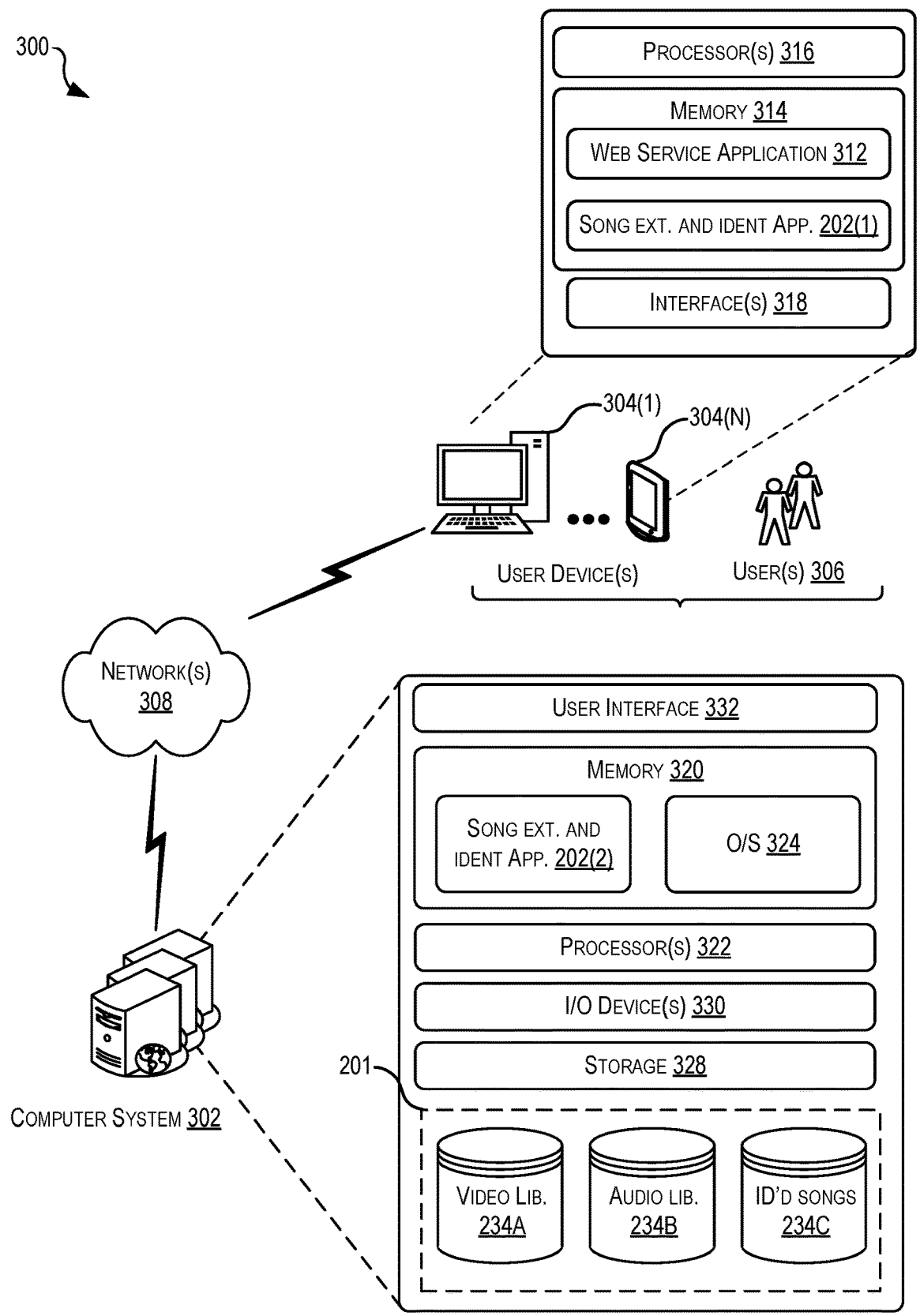
FIG. 3 illustrates an example schematic architecture for implementing techniques relating to language agnostic song extraction and identification, according to at least one example.

FIG. 3 is an example schematic architecture 300 for implementing techniques relating to dimensional object identification and classification, according to at least one example. The architecture 300 may include a computer system 302 (e.g., the computer system described herein) in communication with one or more user devices 304(1)-304(N) via one or more networks 308 (hereinafter, "the network 308").

The user device 304 may be operable by one or more users 306 to interact with the computer system 302. The users 306 may be administrators, developers, or others that desire to test or utilize operations of the classifying techniques described herein. The user device 304 may be any suitable type of computing device such as, but not limited to, a wearable device, a tablet, a mobile phone, a smart phone, a network-enabled streaming device (a high-definition multimedia interface ("HDMI") micro-console pluggable device), a personal digital assistant ("PDA"), a laptop computer, a desktop computer, a thin-client device, a tablet computer, a high-definition television, a web-enabled high-definition television, a set-top box, etc. For example, the user device 304(1) is illustrated as a desktop computer, while the user device 304(N) is illustrated as an example of a handheld mobile device.

The user device 304 may include a memory 314 and processor(s) 316. In the memory 314 may be stored program instructions that are loadable and executable on the processor(s) 316, as well as data generated during the execution of these programs. Depending on the configuration and type of user device 304, the memory 314 may be volatile (such as random access memory ("RAM")) and/or non-volatile (such as read-only memory (ROM), flash memory, etc.).

In some examples, the memory 314 may include a web service application 312 and a version of the song extraction and identification engine 202 (e.g., 202(1)). The web service application 312 and/or the song extraction and identification engine 202(1) may allow the user 306 to interact with the computer system 302 via the network 308. The user device 304 may also include one or more interfaces 318 to enable communication with other devices, systems, and the like. The song extraction and identification engine 202, whether embodied in the user device 304 or the computer system 302, may be configured to perform the techniques described herein.

Turning now to the details of the computer system 302, the computer system 302 may include one or more computer system computers, perhaps arranged in a cluster of servers or as a server farm, and may host web service applications. The function of the computer system 302 may be implemented a cloud-based environment such that individual components of the computer system 302 are virtual resources in a distributed environment. The computer system 302 also may be implemented as part of an electronic store at which users may purchase items such as those depicted in the images described herein. For example, the electronic store may host users that sell items and may itself sell items. The techniques described herein may be used when onboarding new users that sell or by going through existing databases of images to add the additional information, described herein.

The computer system 302 may include at least one memory 320 and one or more processing units (or processor(s)) 322. The processor 322 may be implemented as appropriate in hardware, computer-executable instructions, software, firmware, or combinations thereof. Computer-executable instruction, software, or firmware implementations of the processor 322 may include computer-executable or machine-executable instructions written in any suitable programming language to perform the various functions described. The memory 320 may include more than one memory and may be distributed throughout the computer system 302. The memory 320 may store program instructions that are loadable and executable on the processor(s) 322, as well as data generated during the execution of these programs. Depending on the configuration and type of memory including the computer system 302, the memory 320 may be volatile (such as RAM and/or non-volatile (such as read-only memory ("ROM"), flash memory, or other memory). The memory 320 may include an operating system 324 and one or more application programs, modules, or services for implementing the features disclosed herein including at least a version of the song extraction and identification engine 202 (e.g., 202(2)). For example, the song extraction and identification engine 202(2) may perform the functionality described herein.

The computer system 302 may also include additional storage 328, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 328, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 302 and/or part of the user device 304.

The computer system 302 may also include input/output (I/O) device(s) and/or ports 330, such as for enabling connection with a keyboard, a mouse, a pen, a voice input device, a touch input device, a display, speakers, a printer, or other I/O device.

In some examples, the computer system 302 may also include one or more user interface(s) 332. The user interface 332 may be utilized by an operator, curator, or other authorized user to access portions of the computer system 302. In some examples, the user interface 332 may include a graphical user interface, voice interfaces, web-based applications, programmatic interfaces such as APIs, or other user interface configurations.

The computer system 302 may also include a data store 201. In some examples, the data store 201 may include one or more databases, data structures, or the like for storing and/or retaining information associated with the computer system 302 and which, in some examples, may be accessible by the user devices 304. For example, the data store 201 may include the data libraries 234A, 234B, and 234C described herein.

Figure 4:
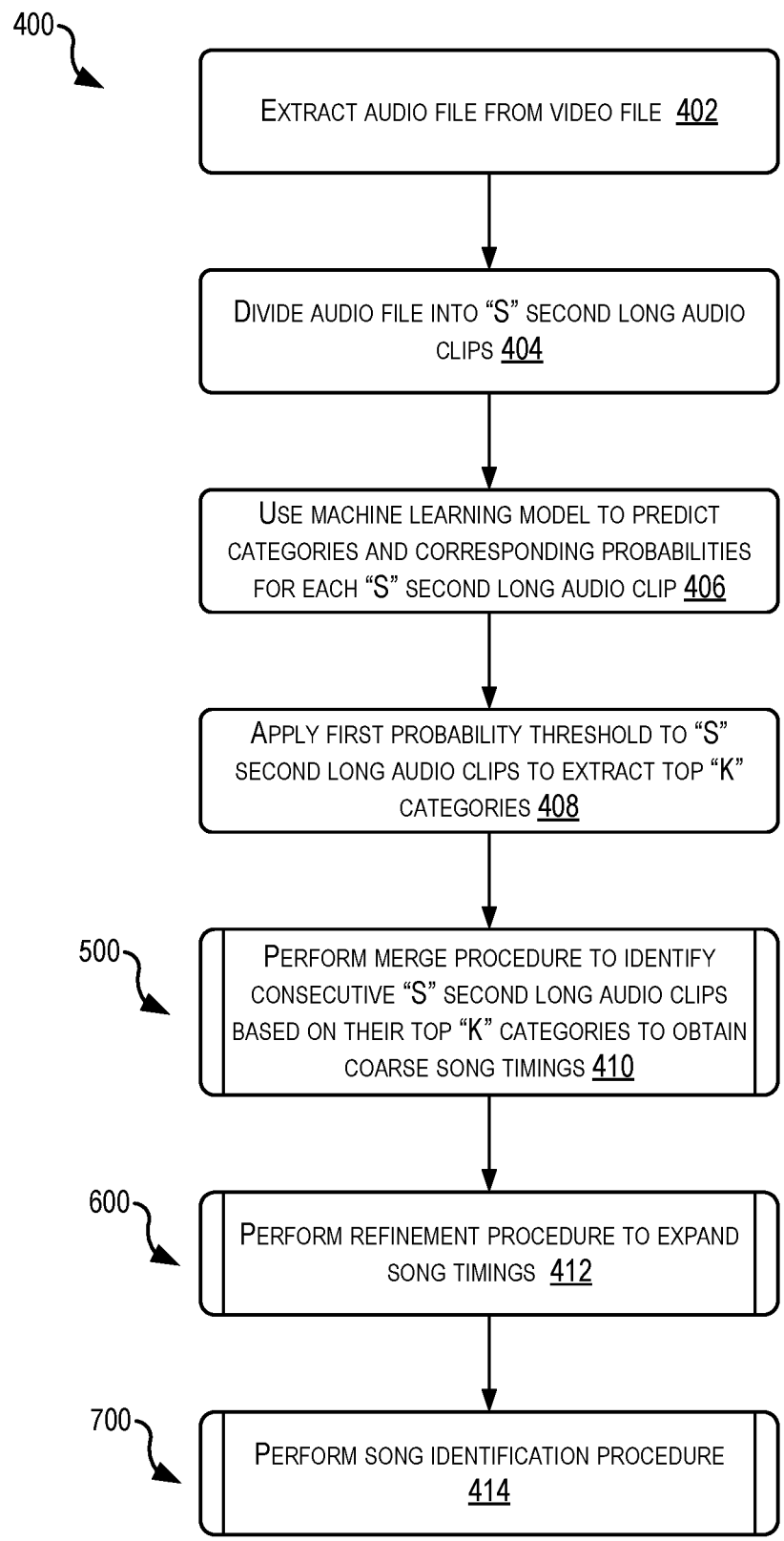
FIG. 4 illustrates an example flowchart showing a process for implementing techniques relating to language agnostic song extraction and identification, according to at least one example.

FIG. 4 is an example flow diagram of a process 400 depicting example acts for implementing techniques relating to language agnostic song extraction and identification, according to at least one example. The process 400 in particular may represent a more or less end-to-end process that identifies songs within an audio file, refines start times and end times of the songs, and compares the songs to existing songs to identify matching songs. From these matches, additional metadata and/or related information may be obtained, e.g., song title, song lyrics, etc. The song extraction and identification engine 202(FIG. 2) embodied in the computer system 302 (FIG. 3) and/or within the user device 304(FIG. 3) may perform the process 400. Thus, while the description below is from the perspective of the computer system 302, the user device 304 may also perform the process 400 or portions of the process 400.

The process 400 may begin at block 402 by the computer system 302 extracting an audio file from a video file. The video file may include video and audio data. The computer system 302 may extract the audio file from a subset of the video file (e.g., via the audio data), and the subset may include some or all of the video file. The block 402 may also include extracting audio files from multiple video files. In some examples, the block 402 has been previously performed, and the computer system 302 accesses the audio files from some memory structure.

The process 400 may continue at block 404 by the computer system 302 dividing the audio file into "S" second long audio clips. The "S" may be a configurable value (e.g., a variable), and, in an example, may range from a few seconds to a few minutes. In some examples, the "S" may be or otherwise include two seconds, three second, four seconds, five seconds, six seconds, seven seconds, or any other suitable amount of time or duration. The computer system 302 may determine the "S" prior to dividing the audio file into the clips. Alternatively, the computer system 302 can determine the "S" at run time or otherwise dynamically or on-the-fly. In an example, the "S" length audio clips may concatenate to form the audio file.

The process 400 may continue at block 406 by the computer system 302 using a machine-learning model to predict categories and corresponding probabilities for each "S" length audio clip. The categories can include audio categories that may define or otherwise represent types of sounds. In an example, the audio categories can include sounds like music, speech, vehicles, musical instruments, inside small room, boom, fusillade, swing music, crumpling, crinkling, lawn mower, splinter, pulleys, creak, gargling, toothbrush, phone, crying, rain, wind, and the like. The probabilities may represent a likelihood that the determined audio category may accurately represent the respective "S" length audio clip. In an example, the machine-learning model, for one or more of the "S" length audio clips, may generate or otherwise identify a set of audio categories that may represent the sounds of the "S" length audio clips, and the machine learning model can generate probabilities corresponding to the set of audio categories.

In some examples, the machine learning model may be a PANNs trained using any suitable training data such as one that includes an expanding ontology of hundreds of audio categories (e.g., between 100 and 1000) and a collection of millions of short labeled sound clips (e.g., 10 second) drawn from a library of video files. The sound clips may have been labeled by human users. The ontology may be specified as a hierarchical graph of sound categories, covering a wide range of human and animal sounds, musical instruments and genres, and common everyday environmental sounds. Since PANNs are trained on a plethora of categories, the output audio embedding produced by these models may contain information about language, gender, vocal and music genre attributes. The embeddings can then be used to identify song timings. Appropriate PANNS may include Convolutional Neural Network (CNN) based architecture consisting of 14 layers. Input to the network may include a Log-Mel Spectrogram of the time-domain audio signal. To compute the Log-Mel Spectrogram, Short time Fourier Transform (STFT) is first applied to time-domain waveforms to calculate spectrograms, second, a mel filter banks transformation is applied to the spectrograms and, finally a logarithmic operation is applied. Thus, the audio clips may be transformed in this manner to be spectrograms of the time-domain audio signals prior to being input into the machine learning model at block 406. In some examples, the raw audio signals of audio clips (e.g., waveform data), rather than transformations, are the input to the machine learning model. In some examples, the inputs may include some combination of spectrograms, waveforms, and/or any other suitable representation of the audio data.

The process 400 may continue at block 408 by the computer system 302 applying a first probability threshold to the "S" length audio clips for extracting or otherwise determining top "K" categories. The "K" may be or otherwise include a configurable value (e.g., a variable) and may include any suitable positive integer value. In an example, "K" may include one, two, three, four, five, six, or other suitable positive integer value. The first probability threshold may include a value ranging from zero to one. The computer system 302 can apply the first probability threshold for filtering or otherwise narrowing the extracted audio categories to the top "K" audio categories that may be the most likely to accurately represent the "S" length audio clips.

The process 400 may continue at block 410 by the computer system 302 performing a merge procedure to identify consecutive "S" length audio clips based on top "K" categories to obtain coarse song timings. The block 410 corresponds to a subprocess of the process 400, described as process 500 in FIG. 5.

Figure 5:
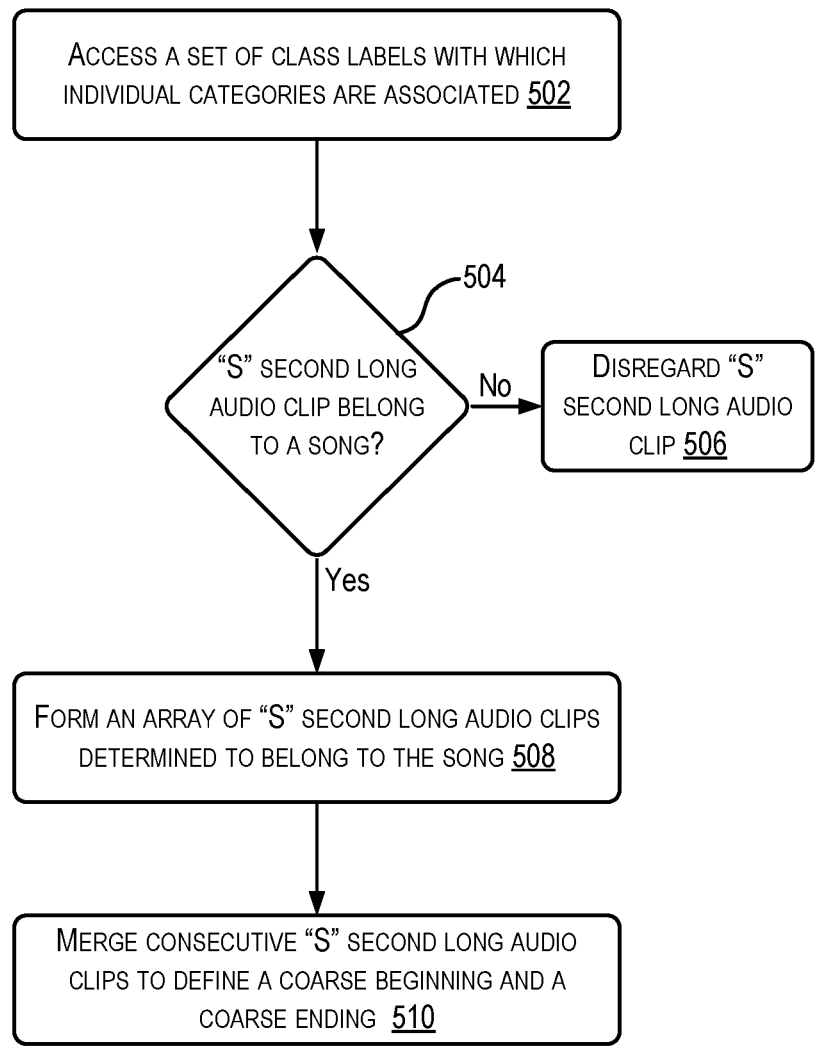
FIG. 5 illustrates an example flowchart showing a process for merging audio clips for defining coarse beginnings and coarse endings of songs, according to at least one example.

FIG. 5 is an example flow diagram of the process 500 depicting example acts for merging audio clips for defining coarse beginnings and coarse endings of songs, according to at least one example. The process 500 in particular, as described above, may correspond to the block 410 in the process 400 and may relate to performing a merge procedure to identify consecutive "S" length audio clips based on their top "K" categories to obtain coarse song timings. The song extraction and identification engine 202 (FIG. 3) embodied in the computer system 302 (FIG. 3) and/or within the user device 304 (FIG. 3) may perform the process 500. Thus, while the description below is from the perspective of the computer system 302, the user device 304 may also perform the process 500 or portions of the process 500.

The process 500 may begin at block 502 by the computer system 302 accessing a set of labels with which individual categories are associated. The individual categories may be or otherwise include audio categories (e.g., speech, music, etc.), and the labels may include labels or classifications (e.g., type of music, type of speech, etc.) within the each or some of the audio categories. The computer system 302 may access the labels via any suitable techniques such as an API call to a library having the labels and the like.

In some examples, the classes may include: speech, song, music, music genres, and removed music genres. The speech class may include, for example, a speech category. The song class may, for example, include categories like singing, choir, yodeling, chant, mantra, male singing, female singing, child singing, synthetic singing, rapping, humming, song, and the like. The music class may, for example, include categories like music, musical instrument, plucked string instrument, guitar, electric guitar, bass guitar, sitar, mandolin, zither, piano, organ, drum, bass drum, tabla, cymbal, maraca, gong, vibraphone, orchestra, brass instrument, French horn, string section, trombone, fiddle, pizzicato, scratching, cheering, applause, finger snapping, clapping, hands, and the like. The music genres class may, for example, include categories like pop music, hip hop music, beatboxing, rock music, punk rock, grunge, rock and roll, rhythm and blues, reggae, country, opera, disco, salsa, flamenco, blues, music for children, music of Bollywood, lullaby, video game music, wedding music, scary music, and the like. The removed music genres class may, for example, include categories like background music, theme music, soundtrack music, Christmas music, and any other type to be excluded.

The process 500 may continue at block 504 by the computer system 302 makes a determination of whether an "S" length audio clip belongs to a song. In an example, the computer system 302 may determine whether an "S" length audio clip belongs to a song by (i) evaluating top "K" audio categories with respect to a set of conditional rules defined in terms of class labels, and (ii) applying one or more probability thresholds to probabilities associated with the "S" length audio clip. As an example of (ii), the computer system 302 may apply the probability threshold to define the top "K" categories and or to further refine the set of categories otherwise identified. As an example of (i), the computer system 302 may evaluate a set of conditional rules such as checking whether the top "K" audio categories of an "S" length audio clip meet one or more of the following conditions: (speech class and song class) and not in (removed music genres class); (song class) or (song class and music class) or (song class and music genre class) and not in (removed music genres class); and/or (speech class and music genres class) or (speech class and music class) and not in (removed music genres class). Evaluating the set of conditional rules out clips with irrelevant sound categories.

If during the determination at block 504, the computer system 302 determines that the "S" length clip does not belong to a song, then the process may continue at block 506 by the computer system 302 disregarding the "S" length audio clip. If the computer system 302 determines that the "S" length clip does belong to a song, the process may proceed to block 508.

The process 500 may continue at the block 508 by the computer system 302 forming an array of "S" length audio clips determined to belong to the song. In an example, the array may be any suitably sized one-dimensional array having any suitable amount of "S" length audio clips determined to belong to the song. The array may arrange the "S" length audio clips in chronological order (e.g., ordered by time values with respect to the original audio file).

The process 500 may continue at block 510 by the computer system 302 merging consecutive "S" length audio clips to define a coarse song beginning and a coarse song ending of a coarse song. The computer system 302 can merge the consecutive "S" length audio clips using a concatenation operation or any other suitable merging operation. The merged "S" length audio clips may represent a coarse song such that the coarse song may be an estimation of the song. The song may be referred to as a coarse song because it has a beginning and an ending that might not directly correspond to the actual beginning and actual ending, as seen in the video file. Later blocks may refine the coarse song by improving the identification of the beginning and ending.

Returning to the process 400, at block 412, the computer system 302 performs a refinement procedure to expand song timings. The block 412 corresponds to a sub process of the process 400, described as process 600 in FIG. 6. The coarse song may include some "S" length audio clips of the song but may be missing some "S" length audio clips. The computer system 302 can perform one or more refinement operations to expand the song timings.

Figure 6:
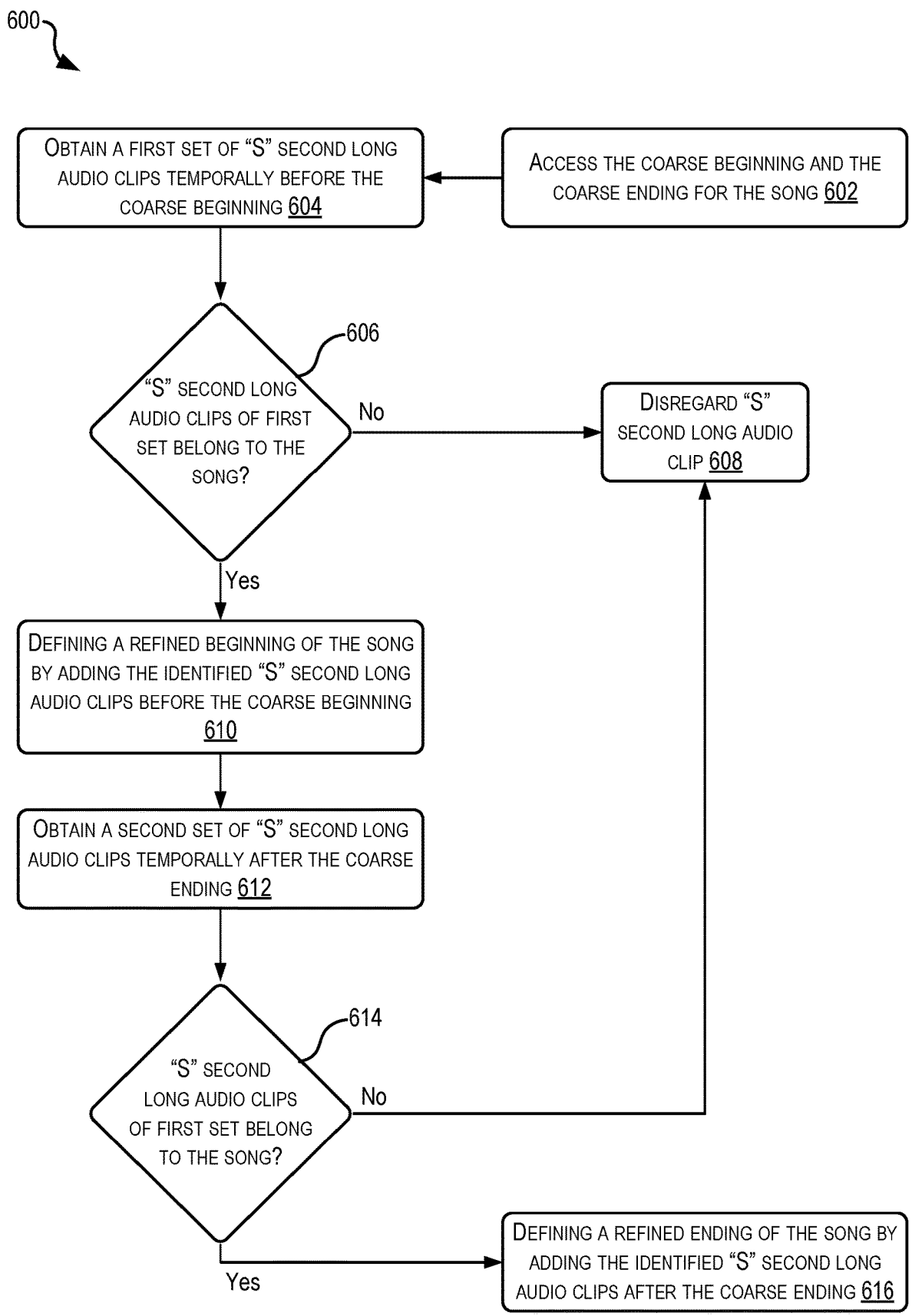
FIG. 6 illustrates an example flowchart showing a process for refining an identified song with coarse beginnings and endings, according to at least one example.

FIG. 6 is an example flow diagram of a process 600 depicting example acts for refining an identified song with coarse beginnings and coarse endings, according to at least one example. The process 600 in particular, as described above, may correspond to block 412 in the process 400 and may relate to a refinement procedure to expand song timings, e.g., coarse beginnings and coarse endings. The song extraction and identification engine 202(FIG. 3) embodied in the computer system 302 (FIG. 3) and/or within the user device 304(FIG. 3) may perform the process 600. Thus, while the description below is from the perspective of the computer system 302, the user device 304 may also perform the process 600 or portions of the process 600.

The process 600 may begin at block 602 by the computer system 302 accessing a coarse song beginning and a coarse song ending of a coarse song. In an example, the computer system 302 may access the coarse song beginning and the coarse song ending of the coarse song generated, merged, or otherwise determined with respect to the process 500. By accessing the coarse song beginning and the coarse song ending of the coarse song, the computer system 302 may be able to adjust the coarse song.

The process 600 may continue at block 604 by the computer system 302 obtaining a first set of "S" length audio clips temporally before the coarse beginning. The computer system 302 may obtain the first set of "S" length audio clips by searching a first configurable amount of time values prior to the coarse song beginning of the coarse song. In an example, the first configurable amount of time can include 10 seconds, 20 seconds, 30 seconds, 40 seconds, 50 seconds, or any other suitable amount of time temporally prior to the coarse song beginning of the coarse song. The computer system 302 may obtain each "S" length audio clip that may exist within the range of between the coarse song beginning and the first configurable amount of time before the coarse song beginning of the coarse song.

The process 600 may continue at block 606 by the computer system 302 determining whether each "S" length audio clip of the first set of "S" length audio clips belongs to the song by determining whether the audio clip belongs to a music class. If the computer system 302 determines that a respective "S" length audio clip does not belong to the song, the computer system 302 may proceed to block 608 where the computer system 302 disregards the respective "S" length audio clip. If the computer system 302 determines that the respective "S" length audio clip does belong to the song, the computer system 302 may proceed to block 610. The computer system 302 may iteratively perform the operation of the block 606 for each "S" length audio clip of the first set of "S" length audio clips.

In an example, the computer system 302 may determine whether "S" length audio clips of the first set belong to the music class and thereby are grouped with the song by (i) evaluating top "K" audio categories with respect to a set of conditional rules defined in terms of class labels. This set of conditional rules may be different than the ones described previously with respect to FIG. 4. As an example of (i), the computer system 302 may evaluate a set of conditional rules such as checking whether the top "K" audio categories of an "S" length audio clip meet one or more of the following conditions: (music genres class or music class) and not in (speech class or removed music genres class). Evaluating this set of conditional rules out clips with irrelevant sound categories. The identified clips may include those that are likely intro parts of the song and outro parts of the song.

The process 600 may continue at block 610 by the computer system 302 defining a refined beginning of the song by adding the identified "S" length audio clips before the coarse song beginning of the coarse song. The refined beginning of the song may include the "S" length audio clips between the coarse song beginning and the configurable amount of time before the coarse song beginning of the coarse song. In an example, adding the "S" length audio clips before the coarse song may include augmenting the "S" length audio clips of the coarse song with the "S" length audio clips before the coarse song beginning of the coarse song.

The process 600 may continue at block 612 by the computer system 302 obtaining a second set of "S" length audio clips temporally after the coarse song ending of the coarse song. The computer system 302 may obtain the second set of "S" length audio clips by searching a second configurable amount of time values subsequent to the coarse song ending of the coarse song. In an example, the second configurable amount of time can include 10 seconds, 20 seconds, 30 seconds, 40 seconds, 50 seconds, or any other suitable amount of time temporally subsequent to the coarse song ending of the coarse song. In another example, the second configurable amount of time may be similar or identical to the first configurable amount of time. The computer system 302 may obtain each "S" length audio clip that may exist within the range between the coarse song ending and the second configurable amount of time after the coarse song ending of the coarse song.

The process 600 may continue at block 614 repeating the determination originally made at block 606 for each "S" length audio clip after the coarse ending of the coarse song. The computer system 302 may determine whether each "S" length audio clip of the "S" length audio clips after the coarse ending of the coarse song belongs to the song. If the computer system 302 determines that a respective "S" length audio clip does not belong to the song, the computer system 302 may proceed to the block 608 by the computer system 302 disregarding the respective "S" length audio clip. If the computer system 302 determines that the respective "S" length audio clip does belong to the song, the computer system 302 may proceed to block 616. The computer system 302 may iteratively perform the operation of the block 614 for each "S" length audio clip of the "S" length audio clips temporally after the coarse ending of the coarse song.

The process 600 may continue at block 616 by the computer system 302 defining a refined ending of the song by adding the identified "S" length audio clips after the coarse song ending of the coarse song. The refined ending of the song may include the "S" length audio clips between the coarse song ending and the second configurable amount of time temporally after the coarse song ending of the coarse song. In an example, adding the "S" length audio clips after the coarse song may include augmenting the "S" length audio clips of the coarse song with the "S" length audio clips temporally after the coarse song ending of the coarse song.

Returning to the process 400, at block 414, the computer system 302 performs a song identification procedure. The block 414 corresponds to a sub process of the process 400, described as process 700 in FIG. 7. The computer system 302 may perform one or more comparison operations for performing the song identification procedure. In an example, the computer system 302 may compare the refined song determined at the block 412 to other, known or identified songs (e.g., included in a song library or the like). The computer system 302 may determine that the refined song may match a known or identified song, and, in response to this determination, may output a determination that the refined song matches the known or identified song. The computer system 302 may perform any other suitable song identification procedure for identifying the refined song.

Figure 7:
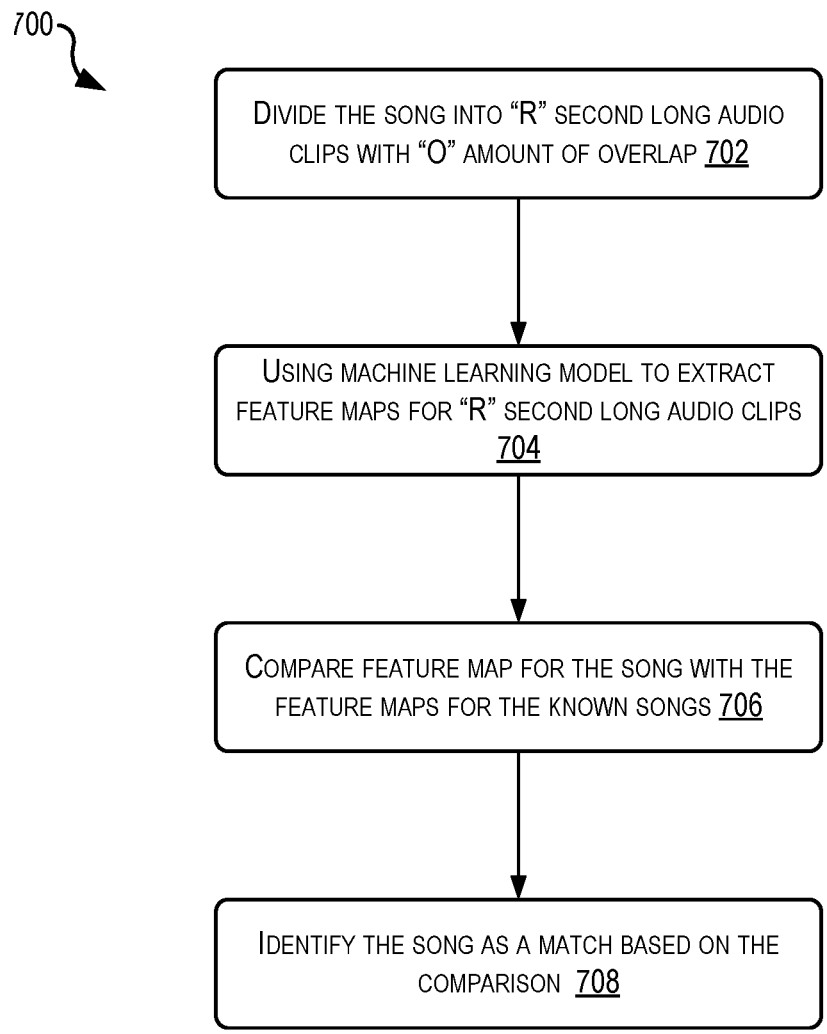
FIG. 7 illustrates an example flowchart showing a process for identifying a match with respect to a song, according to at least one example.

FIG. 7 is an example flow diagram of a process 700 depicting example acts for identifying a match with respect to a song, according to at least one example. The process 700 in particular, as described above, may correspond to block 414 in the process 400 and may relate to an identification procedure. The song extraction and identification engine 202(FIG. 2) embodied in the computer system 302 (FIG. 3) and/or within the user device 304(FIG. 3) may perform the process 700. Thus, while the description below is from the perspective of the computer system 302, the user device 304 may also perform the process 700 or portions of the process 700.

The process 700 may begin at block 702 by the computer system 302 divides the song into "R" length audio clips having "O" amount of overlap. The "R" and the "O" can each be configurable values (e.g., variables). The "R" and the "O" may be predefined or may be determined by the computer system 302 dynamically (e.g., at run-time or otherwise on-the-fly). Each "R" length audio clip may overlap at least partially by "O." In an example, the song may be the refined song determined with respect to the process 600. In some examples, the "R" value may range between 2 seconds and 30 seconds, may be less than 2 seconds, and may be greater than 30 seconds. In some examples, the "O" value may range between 2 and 10 seconds, may be less than 2 seconds, and may be greater than 10 seconds.

The process 700 may continue at block 704 by the computer system 302 using a machine-learning model to extract feature maps for the "R" second long audio clips. The feature maps may be, for example, 2048 dimensional embeddings for the "R" second long audio clips. In some examples, similar embeddings may be generated and/or obtained for a set of known songs obtained from a data store. The set of known songs may be obtained from a music database. Block 702 may be performed on the set of known songs using the same or different values for "R" and "O" as were used for the determined song. In some examples, the values of "R" and "O" for the set of know songs are different. For example, the value of "R" may be between 10 and 45 seconds, may be less than 10 seconds, and may be greater than 45 seconds. The value of "O" may range between 5 and 15 seconds, may be less than 5 seconds, and may be more than 15 seconds. In some examples, the "R" value and the "O" value for the known songs may be greater than the values for the determined song. As noted above, the results of blocks 702 and 704 on the known songs may be cached and accessed by the computer system 302 as part of performing the process 700. Thus, the computer system 302 may generate and/or access feature maps of the known songs as well.

The process 700 may continue at block 706 by the computer system 302 comparing the feature map for the song to the feature maps of the known songs. This may include computing a similarity matrix between the determined song and an "N" number of songs from the database using the cosine similarity between the feature maps. In some examples, any other comparable manner of comparing feature maps, embeddings, vectors, and the like may be used, depending on the form of the feature maps. For example, suitable comparison techniques may include dot product techniques, vector distance comparison techniques, Euclidean distance techniques, and any other suitable mathematical or statistical technique for comparing feature maps.

In some examples, the search space of the "N" songs may be reduced by limiting the search to songs that appear on soundtracks. In some examples, transcribed version of the determined song may also be compared to lyrics from the known songs. This may improve confidence in the match. In some examples, such as when song lyrics are not known for the known songs, the title of the known songs can be compared to transcribed version of the determined song, considering that the title of the song is likely to appear more frequently in the song as compared to others.

The process 700 may continue at block 708 by the computer system 302 identifying the song as a match (with one of the known songs) based on the comparison with respect to the block 706. This may include selecting the known song with the highest similarity as a match. Once a match has been identified, an association between the determined song and the known song may be stored. In addition, metadata and other information from a record of the known song may be extracted and used to update a record of the determined song.

Figure 8:
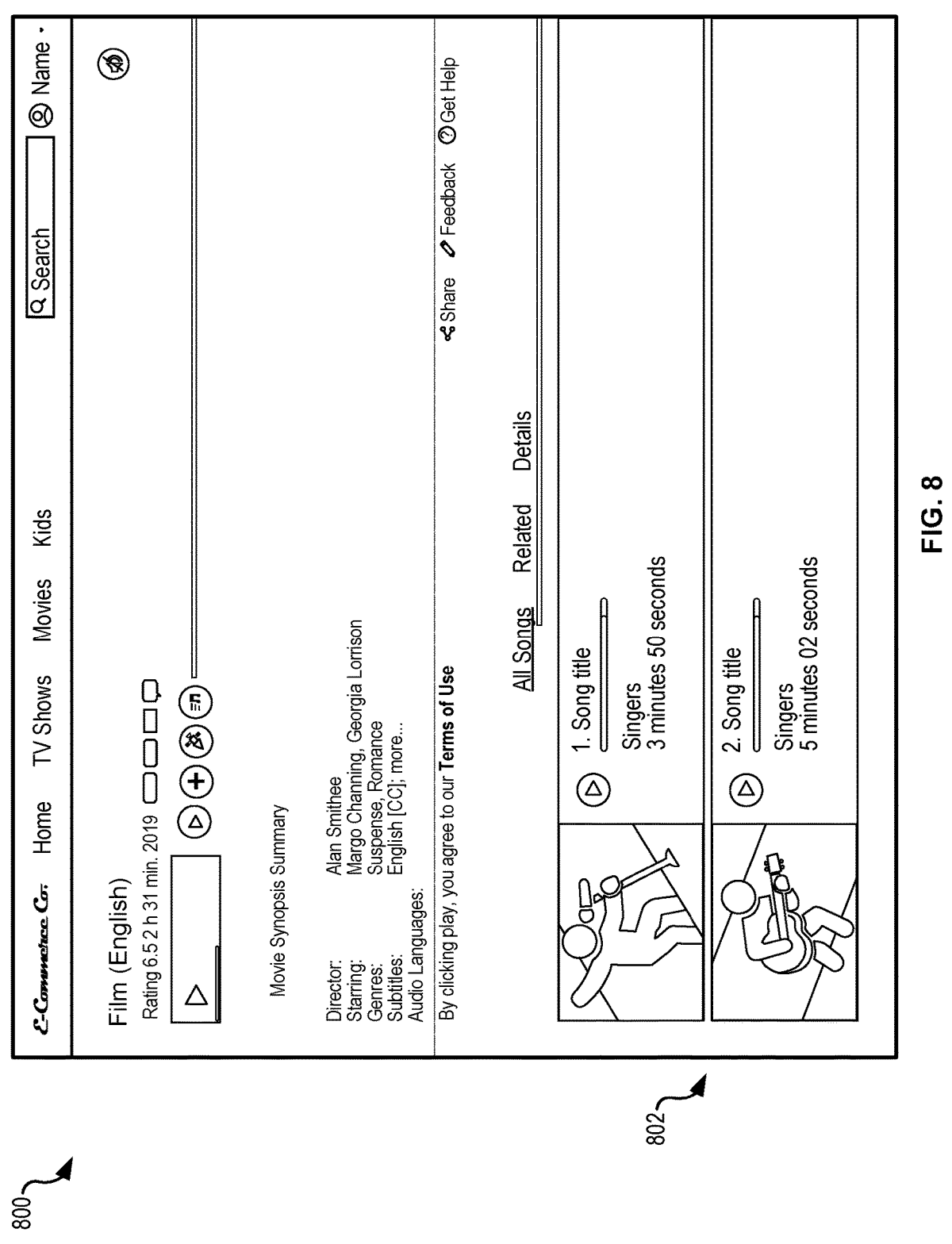

FIG. 8 is an example of a user interface 800 associated with audio song extraction and identification, according to at least one example. The user interface 800 may be presented on a user device such as one of the user devices 304 by communicating with the computer system 302, which is an example of a web server. The user interface 800 may represent an augmented video playback user interface. The user interface 800 may be considered augmented because it has been changed to include a playlist 802 of songs from the movie entitled "Film (English)." The songs in the playlist 802 and at least some of the information presented in the playlist may be generated using the techniques described herein. For example, the move "Film" may be the video file described herein. Since determining the songs from the movies also retains the timing information (e.g., a location of the song within the video), the timing information for the songs may be provided. This may include, not only the length of the songs, but also a location within the movie. Thus, playing one of the songs from the playlist 802 may function to begin playback of the movie at a scene that includes the corresponding song. In this manner, the playlist can be used to skip through and/or just play the "song" portions of the movie.

Figure 9:
FIG. 9 illustrates an example of a user interface associated with language agnostic song extraction and identification, according to at least one example.

FIG. 9 is an example of a user interface 900 associated with audio song extraction and identification, according to at least one example. The user interface 900, which depicts an example view of the movie "Film" from FIG. 8, has been augmented to include a skip feature 902. The skip feature 902 may enable skipping of the song that is about to play or is playing in the movie. The skip feature 902 may be enabled based on the determined songs and corresponding information developed using the techniques described herein.

Figure 10:
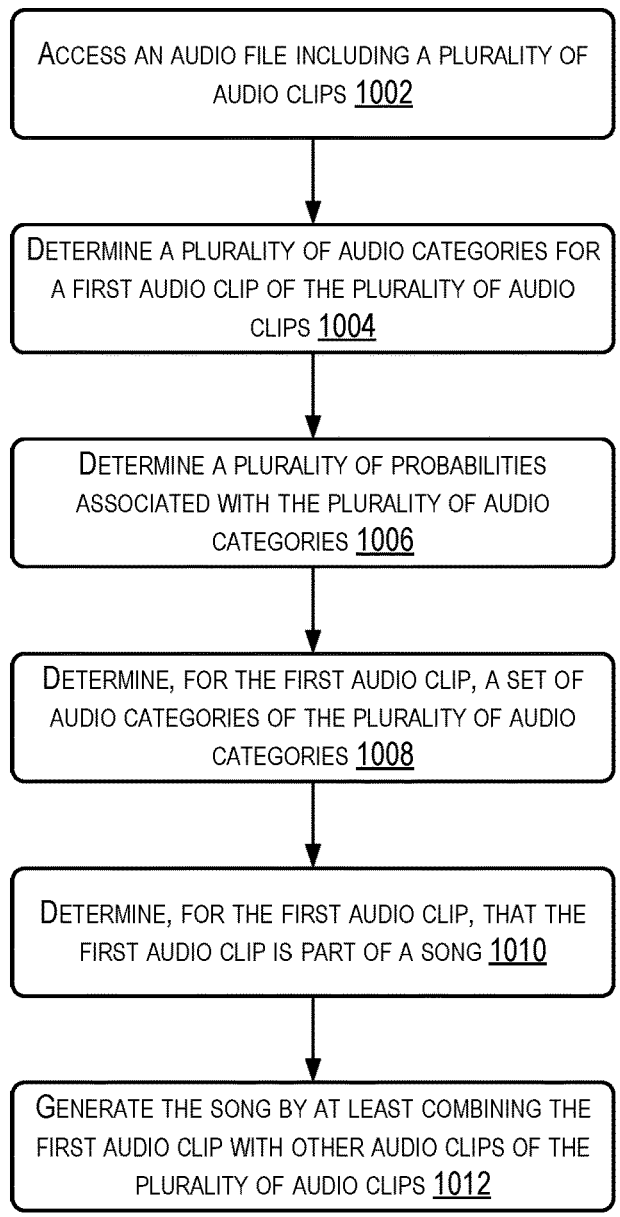
FIG. 10 illustrates an example flowchart showing a process for implementing techniques relating to language agnostic song extraction and identification, according to at least one example.

FIG. 10 is an example flow diagram of a process 1000 depicting example acts for implementing techniques relating to language agnostic song extraction and identification, according to at least one example. The song extraction and identification engine 202(FIG. 2) embodied in the computer system 302 (FIG. 3) and/or within the user device 304(FIG. 3) may perform the process 1000. Thus, while the description below is from the perspective of the computer system 302, the user device 304 may also perform the process 1000 or portions of the process 1000.

The process 1000 may begin at block 1002 by the computer system 302 accessing an audio file that includes a plurality of audio clips. In some examples, the audio file may correspond to a video file. In some examples, the process 1000 may further include determining the plurality of audio clips by at least extracting the audio files from the audio file corresponding to a video file. In some examples, the song may be one of a plurality of songs identifiable from the audio file.

The process 1000 may continue at block 1004 by the computer system 302 determining a plurality of audio categories for a first audio clip of the plurality of audio clip. The plurality of audio categories may correspond to a plurality of sounds.

The process 1000 may continue at block 1006 by the computer system 302 determining a plurality of probabilities associated with the plurality of audio categories. In some examples, each probability may indicate a probability that the first audio clip includes a sound represented by the respective audio category. In some examples, determining the plurality of audio categories and the plurality of probabilities may include inputting the first audio clip into a machine learning model. The machine learning model may be any of those described herein such as a pre-trained audio neural network.

The process 1000 may continue at block 1008 by the computer system 302 determining, for the first audio clip, a set of audio categories of the plurality of audio categories. Block 1008 may be based at least in part on a set of probabilities of the plurality of probabilities corresponding to the set of audio categories. In some examples, each audio category of the set of audio categories may be associated with an audio class label. The audio class labels may each be associated with one or more audio categories. The set of audio categories may include certain categories that are the most relevant to the first audio clip, e.g., are the top "K" categories, as described herein. In some examples, each class label corresponds to a sound genus and each audio category of the plurality of audio categories corresponds to a sound species included in one sound genus.

In some examples, determining the set of audio categories may include applying a first probability threshold using the set of probabilities. The first probability threshold may be selected to include first audio categories in the set of audio categories that have first probabilities that are higher than second probabilities of second audio categories that are excluded from the set of audio categories. The probability threshold may correspond to the threshold used to define the top "K" categories.

The process 1000 may continue at block 1010 by the computer system 302 determining, for the first audio clip, that the first audio clip is part of a song. The block 1010 may be based at least in part on the set of probabilities and audio class labels associated with the set of audio categories. In some examples, determining that the first audio clip is part of the song based may include applying a probability threshold using the set of probabilities, and evaluating the first audio clip according to one or more audio class conditional statements using the audio class labels associated with the set of audio categories of the first audio clip. The threshold may act as a first filter to reduce the audio clips to those that are likely music, then the evaluating may function to identify audio clips in the reduced set that are likely a song.

The process 1000 may continue at block 1012 by the computer system generating the song by at least combining the first audio clip with other audio clips of the plurality of audio clips. In some examples, combining the first audio clip with other audio clips of the plurality of audio clips may include merging the first audio clip and the other audio clips consecutively. This may define the song as having a beginning and an ending.

In some examples, generating the song at block 1012 defines a coarse song beginning and a coarse song ending. In this example, the process 1000 may further include performing a refinement procedure to generate a refined song beginning and a refined song ending. This may include identifying a first subset of audio clips that is temporally before the first audio file and the other audio files, identifying a second subset of audio clips that is temporally after the first audio file and the other audio files, determining, for each audio clip of the first and second subset of audio clips, whether the respective audio clip is part of the song based at least in part on respective category labels associated with each audio clip of the first and second subset of audio clips, and adding the audio clips determined to be part of the song to the song to define a refined song.

In some examples, the process 1000 may also include a slightly different refinement procedure, such as described herein. In this example, the process 1000 may further include identifying a first subset of audio clips that is temporally before the first audio file and the other audio files, and identifying a second subset of audio clips that is temporally after the first audio file and the other audio files. Next, the process 1000 may further include determining, for each audio clip of the first and second subset of audio clips, whether the respective audio clip is part of the song based at least in part on respective category labels associated with each audio clip of the first and second subset of audio clips, adding first audio clips of the determined audio clip to the song at first locations temporally before the first audio clip and the other audio clips, and adding second audio clips of the determined audio clips to the second at second locations temporally after the first audio clip and the other audio clips. In some examples, adding the first audio clips defines a new song beginning time and adding the second audio clips defines a new song ending time.

In some examples, the process 1000 may further include mapping the song to a known song by at least: dividing the song into a plurality of different audio clips each including at least some overlap with each other, determining a first audio signature for each different audio clip of the plurality of different audio clips, comparing the first audio signatures of the plurality of different audio clips with second audio signatures representing a plurality of known songs, and selecting the known song from the plurality of known songs based at least in part on comparing the first audio signatures with the second audio signatures. In some examples, the audio signatures may be averaged. In some examples, the plurality of different audio clips may include at least some overlap with each other. In some examples, determining the first audio signature for each audio clip may include extracting a dimensional embedding for each audio clip by inputting each audio clip into a machine learning model.

Figure 11:
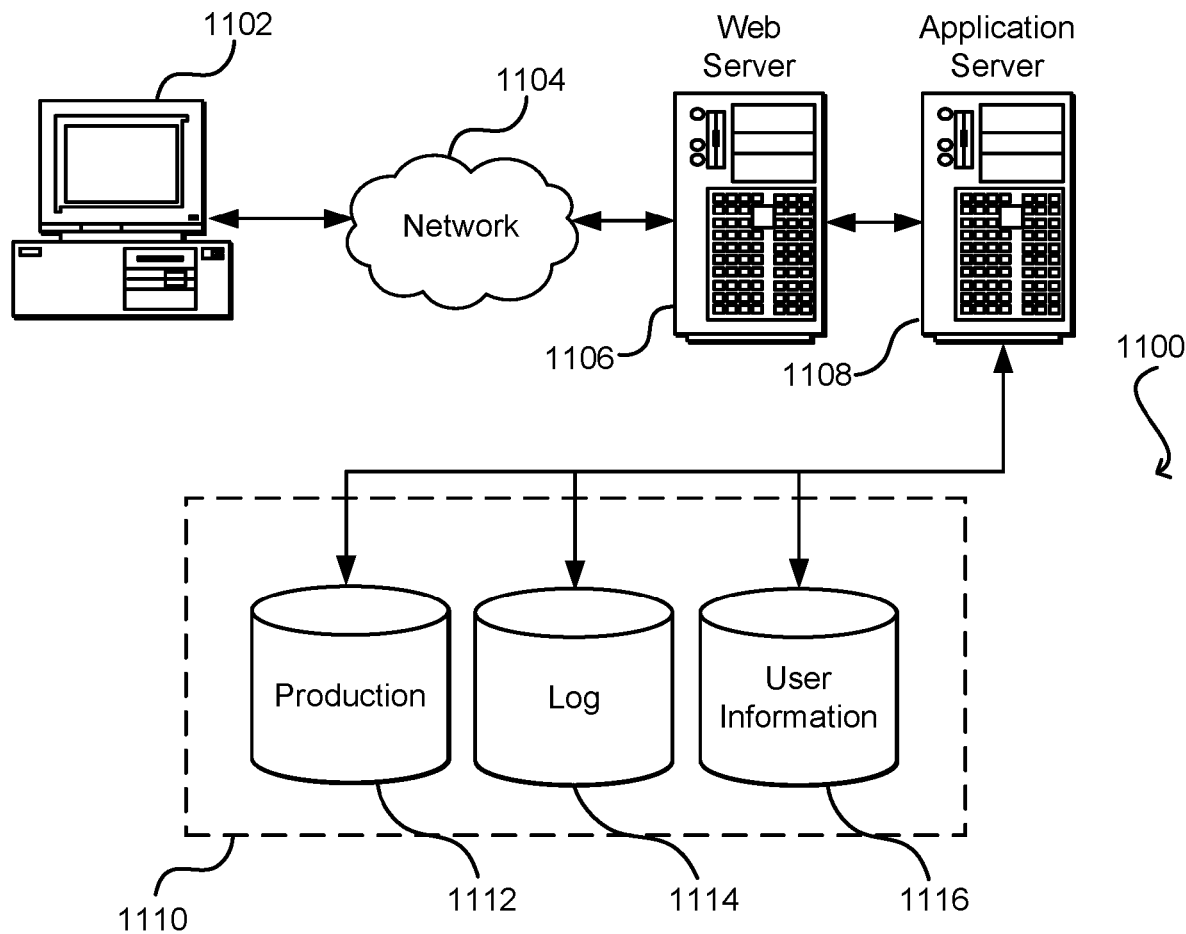
FIG. 11 illustrates an environment in which various examples can be implemented.

FIG. 11 illustrates aspects of an example system 1100 for implementing aspects in accordance with various examples. As will be appreciated, although a Web-based environment is used for purposes of explanation, different environments may be used, as appropriate, to implement various examples. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side.

The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UPnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In examples utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail.

It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable media comprising computer-executable instructions that, when executed by one or more processors of a computer system, cause the computer system to perform operations comprising:
    determining a plurality of audio clips based at least in part on an audio file corresponding to a video file;
    training an audio neural network to generate a pre-trained audio neural network (PANN), wherein the training comprises training the PANN using an ontology comprising labeled audio categories and labeled sound clips, wherein the ontology comprises a hierarchical graph of sound categories, wherein training the audio neural network to generate the PANN comprises generating the PANN to receive an audio signal to output audio embeddings having attributes about the audio signal;
    determining, for a first audio clip of the plurality of audio clips, and by inputting the first audio clip into the PANN:
        a plurality of audio categories that correspond to a plurality of sounds; and
        a plurality of probabilities associated with the plurality of audio categories, each probability indicating a probability that the first audio clip includes a sound represented by a respective audio category;
    determining, for the first audio clip, a set of audio categories indicating likelihoods of audio classes being included in the first audio clip, the set of audio categories included in the plurality of audio categories, wherein determining the set of audio categories includes evaluating the first audio clip by applying a first probability threshold using a set of probabilities of the plurality of probabilities that correspond to the set of audio categories, each audio category of the set of audio categories being associated with a different audio class label of a set of audio class labels, wherein the determining comprises applying the first probability threshold to define a top predetermined number of categories with respect to a set of conditional rules defined in terms of class labels;
    determining, for the first audio clip, that the first audio clip is part of a song by:
        applying a second probability threshold using the set of probabilities; and further evaluating the first audio clip according to one or more audio class conditional statements using the set of audio class labels associated with the set of audio categories of the first audio clip to refine the set of audio categories associated with the first audio clip; and generating the song by:
  combining the first audio clip with other audio clips of the plurality of audio clips to generate a coarse song beginning and a coarse song ending;
  identifying a refined song beginning and a refined song ending using the plurality of audio categories; and
  replacing the coarse song beginning and the coarse song ending with the refined song beginning and the refined song ending, respectively.

2. The one or more non-transitory computer-readable media of claim 1, wherein the operations further comprise determining the refined song beginning and the refined song ending by at least:
  identifying a first subset of audio clips that is temporally before the first audio clip and the other audio clips;
  identifying a second subset of audio clips that is temporally after the first audio clip and the other audio clips;
  determining, for each audio clip of the first and second subset of audio clips, whether a respective audio clip is part of the song based at least in part on respective category labels associated with each audio clip of the first and second subset of audio clips; and
  adding the audio clips determined to be part of the song to the song to define a refined song.

3. The one or more non-transitory computer-readable media of claim 1, wherein each category label of a plurality of category labels corresponds to a sound genus and each audio category of the plurality of audio categories corresponds to a sound species included in one sound genus.

4. The one or more non-transitory computer-readable media of claim 1, wherein combining the first audio clip with other audio clips of the plurality of audio clips comprises merging the first audio clip and the other audio clips consecutively.

5. The one or more non-transitory computer-readable media of claim 1, wherein the one or more audio class conditional statements are usable to determine whether a relevant class of audio is present in the first audio clip.

6. The one or more non-transitory computer-readable media of claim 1, wherein the labeled sounds clips comprise sound clips that are each less than 10 seconds in duration.

7. A computer-implemented method, comprising:
  accessing an audio file comprising a plurality of audio clips;
  training an audio neural network to generate a pre-trained audio neural network (PANN), wherein the training comprises training the PANN using an ontology comprising labeled audio categories and labeled sound clips, wherein the ontology comprises a hierarchical graph of sound categories, wherein training the audio neural network to generate the PANN comprises generating the PANN to receive an audio signal to output audio embeddings having attributes about the audio signal;
  determining for a first audio clip of the plurality of audio clips, and by inputting the first audio clip into the PANN:
    a plurality of audio categories that correspond to a plurality of sounds; and
    a plurality of probabilities associated with the plurality of audio categories, each probability indicating a probability that the first audio clip includes a sound represented by a respective audio category;
  determining, for the first audio clip, a set of audio categories indicating likelihoods of audio classes being included in the first audio clip, the set of audio categories included in the plurality of audio categories, wherein determining the set of audio categories includes evaluating the first audio clip based at least in part on a set of probabilities of the plurality of probabilities corresponding to the set of audio categories, each audio category of the set of audio categories being associated with a different audio class label of a set of audio class labels, wherein the determining comprises applying a first probability threshold associated with the set of probabilities to define a top predetermined number of categories with respect to a set of conditional rules defined in terms of class labels;
  determining, for the first audio clip, that the first audio clip is part of a song based at least in part on evaluating the first audio clip using the set of probabilities and the set of audio class labels associated with the set of audio categories to refine the set of audio categories associated with the first audio clip; and
  defining the song by:
    combining the first audio clip with other audio clips of the plurality of audio clips to generate a coarse song beginning and a coarse song ending;
    identifying a refined song beginning and a refined song ending using the plurality of audio categories; and
    replacing the coarse song beginning and the coarse song ending with the refined song beginning and the refined song ending, respectively.

8. The computer-implemented method of claim 7, wherein the audio file comprises an audio track of a video file.

9. The computer-implemented method of claim 7, wherein determining the set of audio categories based at least in part on the set of probabilities comprises applying a probability threshold using the set of probabilities, the probability threshold selected to include first audio categories in the set of audio categories that have first probabilities that are higher than second probabilities of second audio categories that are excluded from the set of audio categories.

10. The computer-implemented method of claim 7, wherein determining that the first audio clip is part of the song based comprises:
  applying a probability threshold using the set of probabilities; and
  evaluating the first audio clip according to the one or more audio class conditional statements using the set of audio class labels associated with the set of audio categories of the first audio clip.

11. The computer-implemented method of claim 7, further comprising:
  identifying a first subset of audio clips that is temporally before the first audio clip and the other audio clips;
  identifying a second subset of audio clips that is temporally after the first audio clip and the other audio clips;
  determining, for each audio clip of the first and second subset of audio clips, whether a respective audio clip is part of the song based at least in part on respective category labels associated with each audio clip of the first and second subset of audio clips;
  adding first audio clips of the determined audio clips to the song at first locations temporally before the first audio clip and the other audio clips; and adding second audio clips of the determined audio clips to the song at second locations temporally after the first audio clip and the other audio clips.

12. The computer-implemented method of claim 7, wherein:
the audio file comprises a plurality of songs identifiable by the computer-implemented method;
the song is a first song of the plurality of songs and is in a first language; generating the song comprises generating a song beginning time and a song ending time for the song; and
a second song of the plurality of songs is in a second language that is different from the first language.

13. The computer-implemented method of claim 7, wherein generating the song comprises generating a song beginning time and a song ending time for the song, and wherein the song beginning time corresponds to a beginning of the song with respect to the audio file, and the song ending time corresponds to an end of the song with respect to the audio file.

14. The computer-implemented method of claim 7, wherein generating the song comprises generating a song beginning time and a song ending time for the song, and wherein the method further comprises extracting the audio file from a video file, and wherein the song beginning time corresponds to a beginning of the song with respect to the video file, and the song ending time corresponds to an end of the song with respect to the video file.

15. The computer-implemented method of claim 7, further comprising mapping the song to a known song by at least:
dividing the song into a plurality of different audio clips, each including at least some overlap with each other;
determining a first audio signature for each different audio clip of the plurality of different audio clips;
comparing the first audio signatures of the plurality of different audio clips with second audio signatures representing a plurality of known songs; and
selecting the known song from the plurality of known songs based at least in part on comparing the first audio signatures with the second audio signatures.

16. A computer-implemented method, comprising:
training an audio neural network to generate a pre-trained audio neural network (PANN), wherein the training comprises training the PANN using an ontology comprising labeled audio categories and labeled sound clips, wherein the ontology comprises a hierarchical graph of sound categories, wherein training the audio neural network to generate the PANN comprises generating the PANN to receive an audio signal to output audio embeddings having attributes about the audio signal;
dividing a song into a plurality of audio clips;
determining an audio signature for each audio clip of the plurality of audio clips by:
determining, for each audio clip and by inputting the audio clip into the PANN, a set of audio categories indicating likelihoods of audio classes being included in each audio clip, wherein determining the set of audio categories includes evaluating each audio clip by applying a first probability threshold using a set of probabilities that correspond to the set of audio categories, each audio category of the set of audio categories being associated with a different audio class label of a set of audio class labels, wherein the determining comprises applying the first probability threshold to define a top predetermined number of categories with respect to a set of conditional rules defined in terms of class labels; and
evaluating each audio clip according to one or more audio class conditional statements using the set of audio class labels associated with the set of audio categories of each audio clip to refine the set of audio categories associated with each audio clip;
averaging the audio signatures of the plurality of audio clips to define an average audio signature for the song;
comparing the average audio signature with a plurality of average audio signatures representing a plurality of known songs; and
matching the song with a known song from the plurality of known songs based at least in part on comparing the average audio signature with the plurality of average audio signatures.

17. The computer-implemented method of claim 16, wherein the plurality of audio clips include at least some overlap with each other.

18. The computer-implemented method of claim 16, wherein determining the audio signature for each audio clip comprises extracting a dimensional embedding for each audio clip by inputting each audio clip into the PANN.

* * * * *